Sept. 29, 1953 E. STIEFELMAYER 2,653,561
METALWORKING MACHINE
Filed June 20, 1949 6 Sheets-Sheet 5

INVENTOR
EUGEN STIEFELMAYER.
BY J E Deringer
His ATTORNEY

Sept. 29, 1953  E. STIEFELMAYER  2,653,561
METALWORKING MACHINE
Filed June 20, 1949  6 Sheets-Sheet 6

INVENTOR
EUGEN STIEFELMAYER.
BY J E Deringer
HIS ATTORNEY

Patented Sept. 29, 1953

2,653,561

UNITED STATES PATENT OFFICE 2,653,561

METALWORKING MACHINE

Eugen Stiefelmayer, Dayton, Ohio, assignor to United Aircraft Products, Inc., Dayton, Ohio, a corporation of Ohio Application June 20, 1949, Serial No. 100,137

6 Claims. (Cl. 113—52)

This invention relates to metal working machinery, particularly as used in the producing of kitchenware by a rotary forging process.

It has heretofore been known to make muffin pans, cake pans and the like by such a process, one or more cavities being formed in a flat metal blank by rolling portions thereof over a frustoconical forming die. An extrusion-spinning operation is carried out by which the material acted upon is elongated to form a cavity in which the wall is relatively thinner than the top and bottom portions which retain the original thickness of the blank.

While, as will be evident from the subsequent detailed disclosure, the present invention may have other applications, a particular use thereof is in the manufacture of an article of kitchenware characterized by a plurality of cavities, the bottoms of which are elevated, there being an annular space between the elevated portion and the outer wall of the cavity. Such pans are useful in preparing congealed molds, having a depression on one side to receive a filler substance, and in preparing similarly used cakes and pastry shells.

To produce a pan so characterized is an object of the invention.

Another object of the invention is to provide a machine for metal working by which a flat metal blank may be shaped with integrally formed annular cavities in a minimum number of steps and with a minimum number of machine operations. In the latter connection, it is proposed to combine in a single machine first and second rotary forging devices operable respectively to form the elevated bottom of the cavities and the outer side wall thereof, a semi-finished and a finished pan being produced in a single cycle of machine operation.

The invention presents numerous features of advantage and has other objects, all of which will more clearly appear from the following description when read in connection with the accompanying drawings, wherein.

Figure 7:
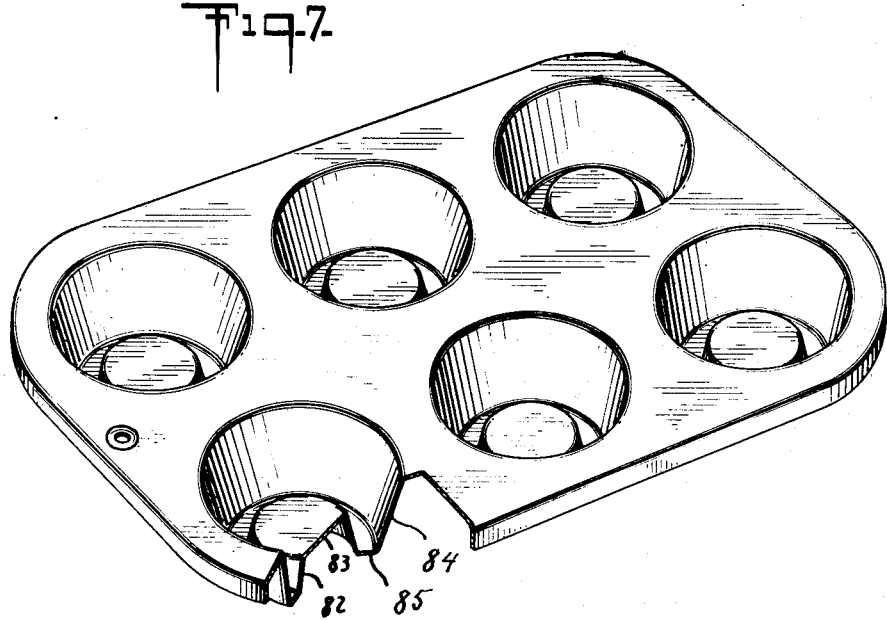
Fig. 7 is a view of a finished pan as produced in the second stage of the forming operation.

Referring to the drawings, a machine is there shown illustrative of the apparatus of this invention, and which is useful in practicing the method of this invention, the machine producing an article of kitchenware as shown in Fig. 7.

The machine is relatively large and heavy, and made up of numerous parts and combinations of parts, not all of which are here shown in detail. Among the parts not clearly shown are certain electrical switches and hydraulic valves by which the machine cycles are initiated, timed, and terminated. These controls are largely conventional, and will be referred to only generally.

Figure 1:
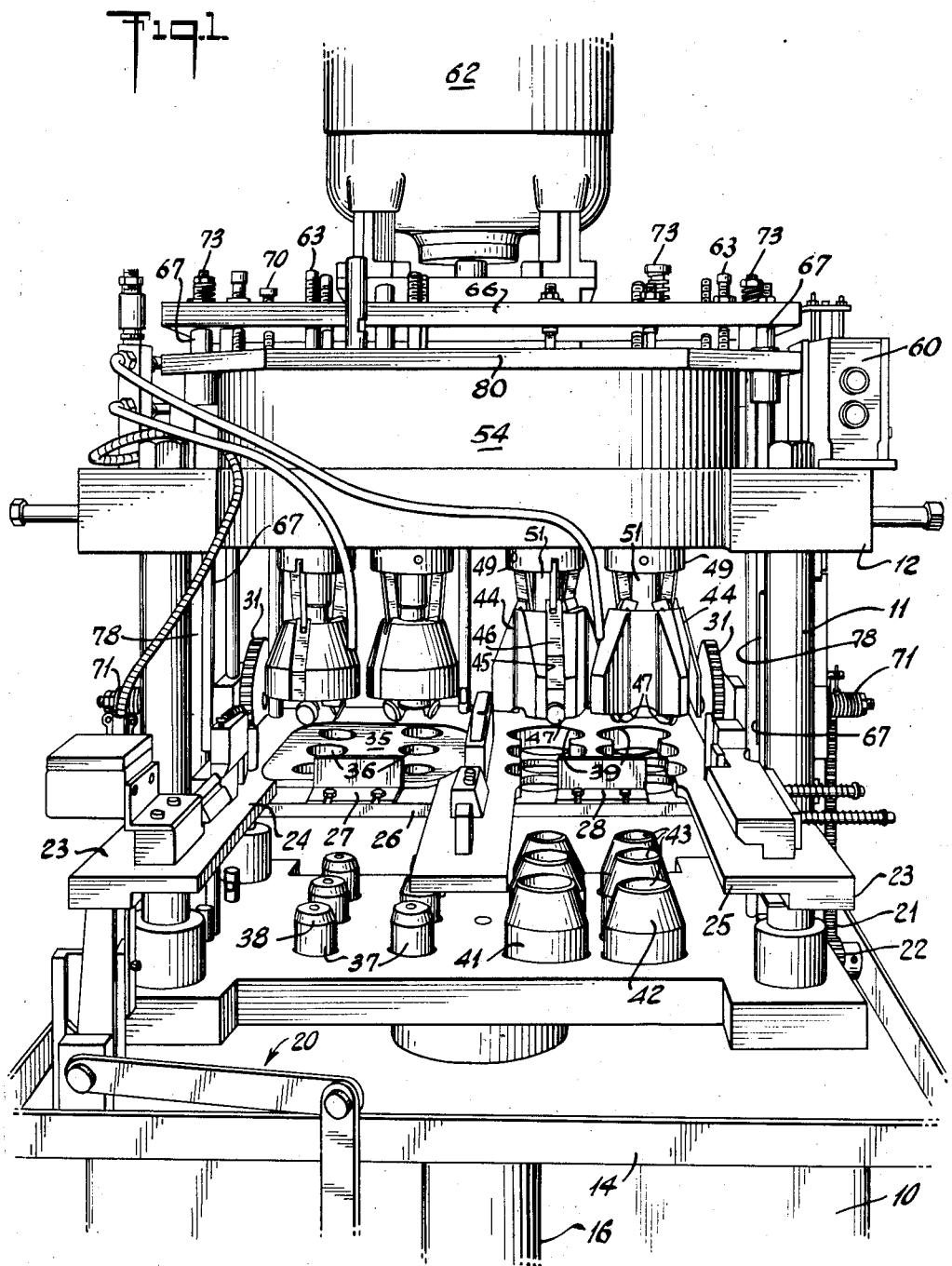
Fig. 1 is a view in front elevation of a machine in accordance with the instant invention.
Figure 2:
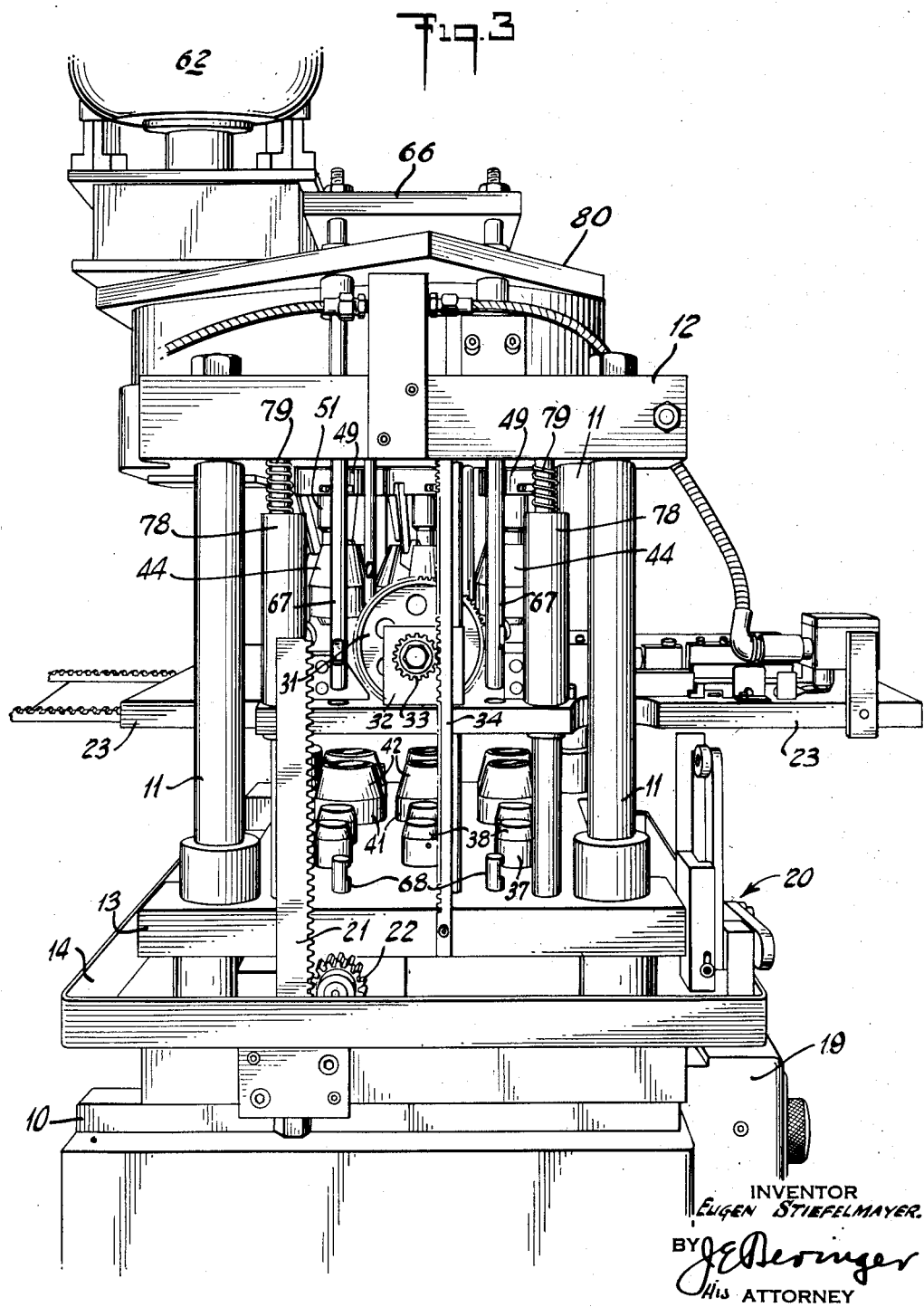
Fig. 2 is a rear view of the machine.

Referring to Fig. 1, the machine comprises a relatively stationary base 10 of generally rectangular shape. Adjacent each of the four corners of the base 10 is an upstanding post 11, the upper ends of the posts 11 cooperatively engaging and supporting a plate 12 which is thus vertically spaced from the base 10 but held in fixed relation thereto. Slidably mounted upon the posts 11 is a platen 13 which normally is at rest within a tray 14 mounted on the base 10. As shown in Fig. 2, there is attached to the underside of the platen 13 a rod 15 which extends vertically downward through the tray 14 into a hydraulic cylinder 16 mounted within the base 10. The cylinder 16 contains a piston (not shown) connected to the rod 15 and reciprocable within the cylinder under the influence of hydraulic fluid alternately supplied to the opposite ends of the cylinder by flexible fluid conduits 17 and 18. The conduits 17 and 18 communicate with a source of hydraulic pressure fluid through a four way valve control 19 (Fig. 3), the operation of which may be automatically controlled by a cam and lever mechanism 20. Under control of the valve 19, the operation of which may be initiated manually or automatically, or both, pressure fluid first is directed through conduit 17 to the bottom of cylinder 16 where it acts to project piston rod 15 from the cylinder to raise the platen 13 upward along the posts 11. To lower the platen, valve 19 functions to discontinue the supply of pressure fluid through conduit 17 and to apply pressure through conduit 18. Accordingly, piston rod 15 is retracted within cylinder 16 and the platen 13 is moved downward along the posts 11.

It is important, for reasons which will hereinafter more clearly appear, that the platen 13 remain in a flat horizontal plane during its reciprocating motion. To this end, there is rigidly set in the base 10 a pair of upstanding toothed racks 21, one of which is arranged adjacent each end of the platen 13. The platen carries a pinion 22 at each end thereof meshing with the teeth on an associated rack 21. As the platen 13 rises, the pinions 22 roll along racks 21 and so preclude the possibility of one end of the platen rising more rapidly than the other to produce an undesirable tilting of the platen.

The work of shaping the metal blanks is carried out within the area between the platen 13 and the plate 12. Arranged in spaced relation to the platen 13 and plate 12 is a table 23 presenting parallel slideways 24 and 25 opening to the front of the machine, as shown in Fig. 1. Supported by the table 23 for fore and aft movement in the machine is a reciprocating member 26, upon the front of which is mounted a pair of brackets 27 and 28 respectively movable within the slideways 24 and 25. On the side edges of the reciprocating member 26 are toothed racks 29 (see Fig. 3) meshing with respective gears 31. Each gear 31 is supported by a bracket 32 mounted on the table 23 and carries a pinion 33 meshing with a vertical rack 34 secured to the platen 13. The arrangement is such that as the platen 13 rises, the pinions 33 and gears 31 are rotated in a counter-clockwise direction, as viewed in Fig. 3, with the result that the racks 29 and reciprocating member 26 of which they are a part are moved rightwardly, as viewed in Fig. 3, or outwardly relatively to the front of the machine. As the platen 13 descends, the pinions 33 and gears 31 are turned in a clockwise direction to move the reciprocating member leftward, as viewed in Fig. 3, and inwardly relatively to the front of the machine. The operation is such as to cause the brackets 27 and 28 on the member 26 to reciprocate within the slideways 24 and 25 as the platen 13 moves upward and downward. Metal blanks placed on the slideways 24 and 25 while the member 26 is in its outer position, accordingly, will be moved or fed into the machine by the brackets 27 and 28 when the member 26 moves inward.

Actuated by the bracket 27, a metal blank mounted on the slideway 24 will move into overlying relation to a plate 35 in which is formed a number of openings 36. The openings 36 overlie and are adapted to receive a corresponding series of forming dies 37 mounted on or integrally formed with the platen 13. Each die 37 is formed at its outer end with a frusto-conical surface 38.

A metal blank moved into the machine by bracket 28 on reciprocating member 26 comes to rest in overlying relation to a series of openings 39 in table 23 adapted to receive a series of forming dies 41 mounted on the platen 13 in parallel side-by-side relation to the series of forming dies 37. The dies 41 have frusto-conical surfaces 42, and, in addition, are formed with depressions or cavities 43 in their frustums. There are six each of the forming dies 37 and 41, corresponding to the six cavities of the pan of Fig. 7, and the dies 37 are relatively smaller in diameter and height than the dies 41.

Figure 4:
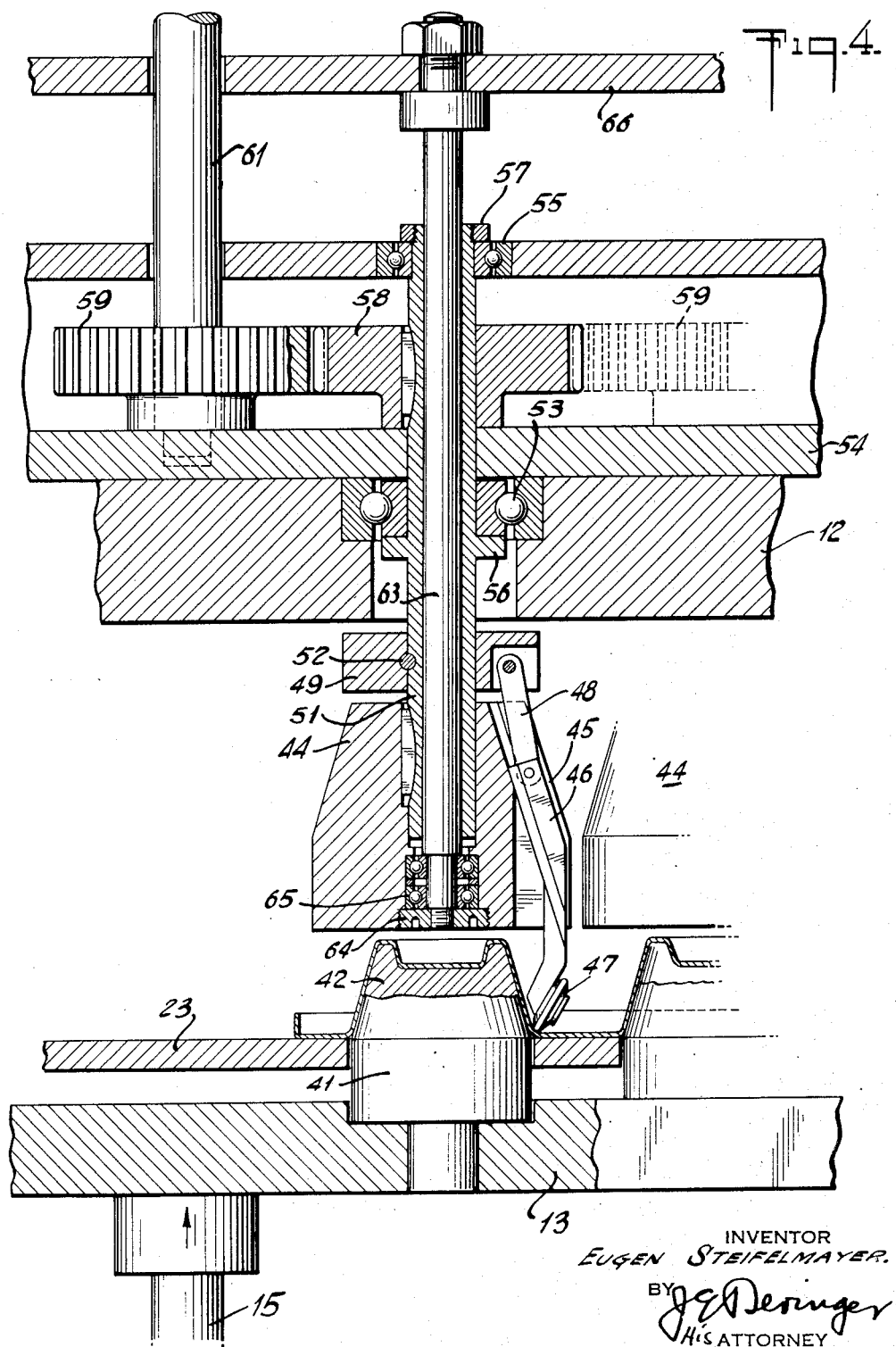
Fig. 4 is a detail view in longitudinal section of one of the forming dies and associated presser head assemblies.

Overlying each forming die 37 and 41 is a presser head assembly which may be more clearly seen by reference to Fig. 4 where one of these assemblies is shown in longitudinal section. As there indicated, each head assembly comprises a head 44, in the outer surface of which is cut three spaced longitudinal slots 45 which are inclined relatively to the axis of the head at an angle substantially corresponding to the angles of the frusto-conical portions of the forming dies. Slidably mounted in each slot 45 is a presser arm 46, mounting on its lower or outer end a roller 47. The arms 46 are connected by links 48 to a disc 49 mounted upon a tubular shaft 51. The disc 49 is held against relative longitudinal movement upon shaft 51 by a transverse pin 52. At its lower end, the tubular shaft 51 is received in a counterbore in head 44. Extending upward from the head 44, the shaft 51 passes through a bearing 53 in plate 12 and through a gear box 54 mounted on the plate 12. Within the upper wall of the gear box 54, the outer end of the shaft 51 is mounted in a bearing 55. A flange 56 on the shaft 51, underlying bearing 53, and a nut 57 thereon, overlying the bearing 55, inhibits axial movement of the shaft 51. Within the gear box 54, the tubular shaft 51 is keyed to a gear 58 meshing directly or indirectly with a gear 59 on the lower end of a drive shaft 61. The shaft 61 extends upwardly out of the box 54 into driven connection with an electric motor 62 mounted on top of the machine. The motor 62 receives its power from a suitable source of electricity, and is energized and deenergized in harmony with the movements of the hydraulically actuated platen 13. The gear box 54 contains a number of gears 58 corresponding to the number of presser heads 44, and all the gears are intermeshed with one another so as to be driven simultaneously upon actuation of the drive shaft 61.

The primary source of control for the motor 62 resides in a switch box 60 (see Figs. 1 and 2) embodying manual and automatic controls, the latter functioning in response to movement of the right hand rack 34 which extends upward into cooperative relation with the switch box.

The presser head 44 is keyed or otherwise secured to the tubular shaft 51. The head, accordingly, rotates with the shaft, carrying the arms 46 therewith, which thus revolve about the axis of the head. Vertical motion of the head 44 relatively to the shaft 51 is accomplished by a rod 63 which extends through the shaft 51 and at its inner end is connected to a nut 64 recessed into the bottom edge of the head 44. Within the head, bearings 65 surround the inner end of the rod 63. The rod 63 projects through and beyond the outer end of tubular shaft 51 and above the gear box 54 is connected to a plate 66. The plate 66 extends beyond the ends of the gear box 54, and, adjacent its ends, has dependent push rods 67 (see Figs. 1 and 2) attached thereto. The rods 67 extend downward through the plate 12 and through the table 23. Cooperative therewith are upstanding studs 68 mounted on the platen 13. The construction and arrangement is such that at a pre-determined point in the upward travel of the platen 13, the studs 68 will contact the rods 67 so that continued upward movement of the platen serves to elevate the rods 67 and thereby plate 66 and the rods 63.

Figure 5:
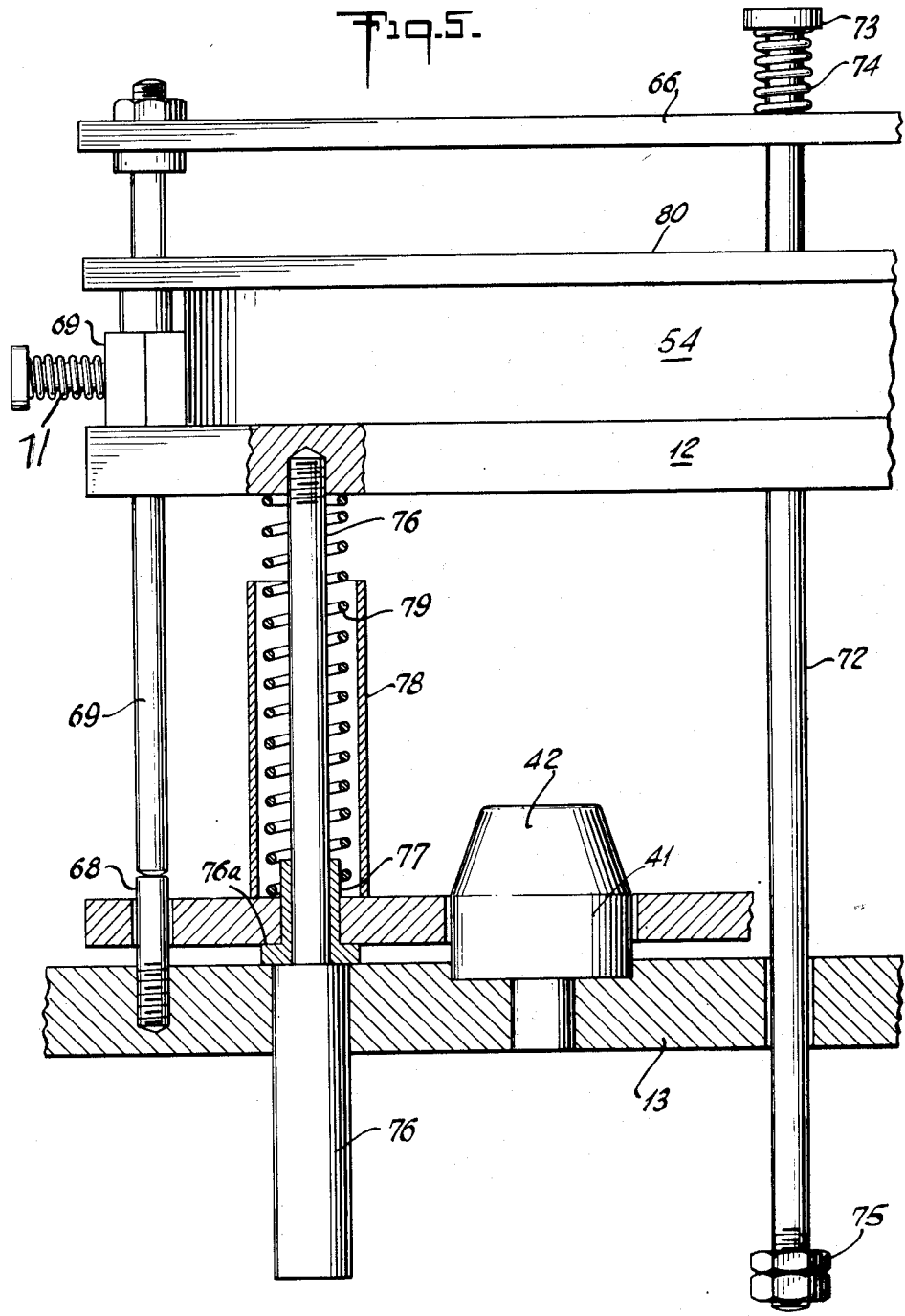
Fig. 5 is a partly diagrammatic view of some of the operating controls of the machine.

Operation of the plate 66 by the rods 67 may be better understood by reference to the partly diagrammatic view Fig. 5. As there shown, one of the rods 67 passes through a brake unit 69 wherein a spring 71 exerts a yielding force to maintain the plate 66 in a selected position of adjustment. Also, as shown in Fig. 5, return of the plate 66 downward is accomplished by rods 72, the upper ends of which project through the plate 66 and have nuts 73 fastened thereto. A spring 74 is interposed between each nut 73 and the plate 66 so that the nut 73 acts upon the plate through a resilient connection. The rods 72 extend downward through the machine and at their lower ends each carries a nut 75, the several nuts 75 being engageable by the platen 13 during its downward travel to restore the plate 66 to a normal or starting position. Such normal or starting position for the plate 66 is defined by studs 70 engageable with a plate 80 mounted on the gear box 54.

Returning to a consideration of the presser head assembly, it will thus be seen that each head 44 has a rotary motion imparted to it by the positively driven shaft 51, and an axial motion imparted by rod 63 and plate 66. The presser arms 46 partake of the rotary motion of the head because of their mounting in slots 45, but they are inhibited by the links 48 attached to disc 49 from following the head 44 in its upward movement. Accordingly, when the head 44 is moved upward by rod 63, the presser arms 46 are in effect projected downward and at the same time are spread radially apart or in an outward direction by reason of the inclination of the slots 45. The presser head assembly selected for illustration in Fig. 4 is one associated with a forming die 41. Such forming die is axially aligned with the head 44. As the die rises in response to upward travel of the platen 13, the frusto-conical portion thereof enters and passes through an opening 39 in the table 23. As the frustrum of the die approaches the head 44, the studs 68 on the platen engage rods 67 and elevate plate 66. As a result, the head 44 moves upward in correspondence with the movement of the platen 13 leaving the presser arms 46 to traverse the conical portion of the die. At the start of upward movement of the head 44, the rollers 47 on the arms 46 are aligned with the outer edge of the frustrum of the die. As the head moves upward, however, the arms 46 are cammed outward, causing the rollers 47 to follow the conical formation of the die. Inasmuch as the head 44 is being rotatively driven at this time, the rollers 47 revolve about the forming die, and, by their combined rotary and radial movements, exercise a forging or extrusion action upon the work interposed between the rollers and the die.

During the latter part of the upward travel of the platen 13, the table 23 is caused to move with the platen so that a support will be provided for that portion of the work not being acted upon by the rollers 47.

Figure 3:
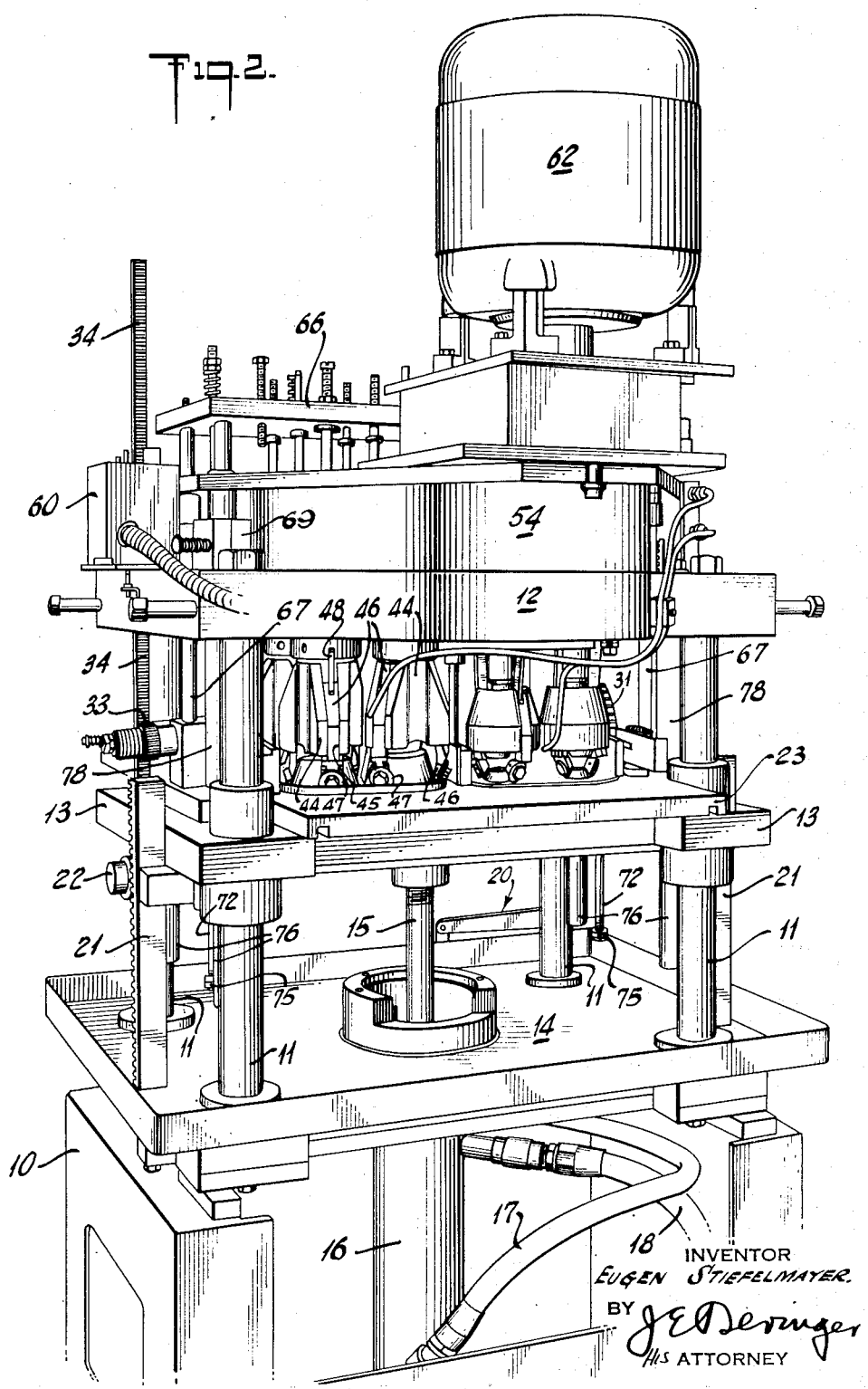
Fig. 3 is a side view of the machine.

Referring to Figs. 3 and 5, a plurality of shafts 76 have their one ends anchored in the fixed plate 12 and extend downward through registering openings in the table 23 and platen 13 adjacent respective posts 11. Surrounding each shaft 76 and pressed into the table 23 is a bushing 77 with which the shaft has a sliding fit. The lower end of the bushing 77 is outturned to engage the underside of the table 23 and rests upon an annular shoulder 76a on shaft 76. The table 23 thus normally is supported at spaced points by the shoulders 76a on the shafts 76. A cylinder 78 is loosely mounted on the top of table 23 in surrounding relation to each shaft 76, the top of the cylinder being spaced from the plate 12 a distance corresponding to and defining the extent of rise permitted the platen 13. Extending into each cylinder 78 and interposed between the plate 12 and table 23 is a coil spring 79. As the platen 13 rises, it engages the underside of table 23 at the relatively broad side edges thereof at about the same time that the frusto-conical portions on the forming dies 37 and 41 pass through the table. In response to continued motion of the platen, therefore, the table 23 is carried upward and such motion is continued until the cylinders 78 contact the underside of plate 12, the cylinders 78 thus providing a positive limit of upward travel for the platen 13 and table 23. Upon descent of the platen 13, the springs 79 are effective to return the table 23 downward to its normal position. The shafts 76 serve as guides to maintain the table 23 and platen 13 in parallelism.

Figure 6:
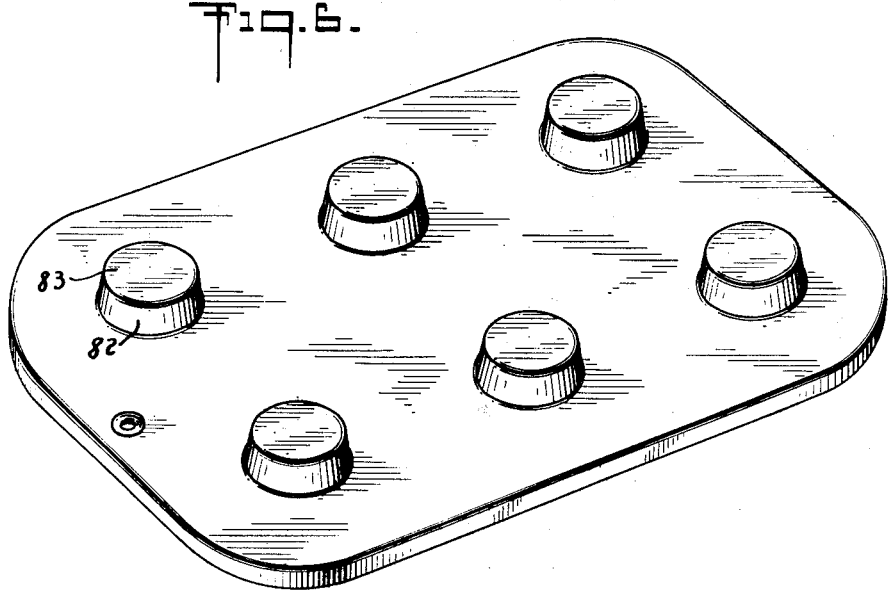
Fig. 6 is a view of a semi-finished pan as produced in the first stage of the forming operation.

In the operation of the machine, the parts normally are positioned as shown in Fig. 1 with the platen 13 in its lowermost position. At this time, the reciprocating member 26 is moved fully inward. Upon actuation of the four way valve control 19, the platen 13 is caused to rise, and, in response thereto, the reciprocating member 26 is moved outward. When the reciprocating member is at the limit of its outward travel, a flat metal blank, which may have its edges inturned, is placed upon the slideway 24. Now, when the control valve 19 acts to cause descent of the platen 13, the reciprocating member 26 is effective to push the metal blank into position upon the plate 35. On the succeeding upward travel of the platen 13, the forming dies 37 pass through the openings 36 in plate 35 and contact the metal blank supported thereon. As the conical portions 38 on the dies 37 pass through the openings 35, contact of the platen with the table 23 occurs, and the table and platen move upward together carrying the blank into cooperative relation with the presser head assemblies. Rotation of the presser head assemblies by electric motor 62 has previously been initiated so that the heads 44 now are rotating and carry the arms 46 about the axis of the dies 37. As upward motion of the platen 13 and table 23 continues, studs 68 contact rods 67 to raise plate 66 and lift rods 63 and heads 44. The arms 46, carrying rollers 47, remain to contact the metal blank and under the influence of continuously applied axial pressure through the dies 37 and by reason of the rotary force imparted through heads 44, the rollers 47 press the metal of the blank into conformance with the slope of the conical portions of the dies. Within the zone acted upon by the rollers 47, the metal of the blanks is in effect extruded, a rotary forging operation taking place which thins the metal without alteration in the original dimensions of the blank. Limiting of the upward travel of the platen 13 is pre-determined to coincide with the arrival of the rollers 47 at the base of the conical portions of the dies, and there is thus formed in the blank a plurality of spaced frusto-conical shaped cavities which are separated from one another by a web of material of the original thickness of the blank. Similarly, the metal overlying the frustrums of the forming dies retains the original thickness of the blank. A semi-finished pan, as shown in Fig. 6, thus is produced, the extruded portions of the blank comprising a tapered side wall 82 and a portion 83 spaced from and parallel to the original plane of the blank.

The forming dies 41 are designed to operate upon a blank which has been semi-finished by reason of having been acted upon by the forming dies 37. Thus, a blank shaped by the dies 37 is inverted and re-inserted in the machine upon the slideway 25. There, it is moved by the reciprocating member 27 into cooperative relation with the forming dies 41 and their associated presser head assemblies. The extruded portions of the blank previously formed by the dies 37 are received by the dies 41 within the depressions 43 therein, this operation being indicated in Fig. 4. The shaping of the blank by the dies 41 is accomplished in substantially the same manner as that described in connection with the dies 37. The depressions 43 in the frustums of the dies 41 define an annular wall on the working ends of the dies 41, which, in turn, defines an annular space in the finished pan between the inner and outer walls thereof. Thus the finished pan, as shown in Fig. 7, includes a tapered wall 84, inclined in a direction opposite to the taper of inner wall 82, and a relatively thick bottom portion 85 interconnecting the walls 82 and 84. The conical portions 42 of dies 41 being relatively longer than the conical portions 38 of dies 37, the cavity formed in the second stage of the operation is relatively deeper and wider than that formed in the first stage. Thus the portion 83 assumes the form of an elevation in the bottom of the larger outer cavity.

It will be understood that a semi-finished pan and a finished pan are produced simultaneously by the machine in a single operation. Thus, while the forming dies 37 are acting upon a flat metal blank, the forming dies 41 are operating at the same time upon a blank which has been pre-shaped by the dies 37. It further is to be noted that as the platen 13 and the table 23 descend from a shaping operation, the semi-finished and finished pans in the machine are automatically ejected rearwardly by the new blanks being pushed into place by the reciprocating member 26. In the use of the machine it has been found desirable to associate therewith a conveyor belt which receives a semi-finished pan ejected from the slideway 24 and returns it to the front of the machine where the operator may pick it up, invert it, and place it upon the slideway 25 at the same time that he places a new blank upon the slideway 24.

The rotary forging operation preferably is carried out in the presence of an oil spray supplied through conduits 86. The discharged oil collects in the tray 14 from whence it may be carried off to a place of drain.

What is claimed is:

1. A machine for forming one-piece seamless baking pans characterized by a plurality of annular cavities or depressions, including a reciprocable platen, first and second series of frusto-conical forming dies carried by said platen in side-by-side relation, the dies of said first series being smaller than the dies of said second series and the dies of said second series being formed with a depression in the frustums thereof, a rotatable head member for each said dies supported in axially spaced relation thereto, a plurality of presser arms carried by each of said head members for angular sliding motion relative to the axis thereof, means for rotating said heads, means for effecting relative sliding motion between said heads and their respective arms in response to reciprocating motion of said platen to cause said presser arms to traverse said dies, means for mounting a flat metal blank between said first series of dies and its associated head members, and means for mounting a blank preformed by said first series of dies between said second series of dies and its associated head members, the preformed blank being inversely arranged relative to the flat metal blank and the tapers formed therein being received in the depressions in the frustums of the dies of said second series.

2. A machine according to claim 1, characterized by means operable by said platen for simultaneously advancing an unformed blank and a preformed blank into cooperative relation with said first and second series of dies respectively.

3. A machine for forming one-piece seamless baking pans characterized by a plurality of annular cavities or depressions, including a reciprocable platen, first and second series of frusto-conical forming dies carried by said platen in side-by-side relation, the dies of said first series being smaller than the dies of said second series and the dies of said second series being each formed with a depression in the frustum thereof, a rotatable presser head assembly associated with each of said dies and including presser arms longitudinally to traverse the taper of said die, and means for mounting metal blanks in said machine to have portions thereof extruded over said forming dies by said presser arms, the blank acted upon by said second series of dies being one previously shaped by said first series of dies and reversely arranged, the extruded portions thereof being received in the depressions in the frustums of said second series of dies.

4. A machine for forming an annular cavity in a flat metal blank, including a reciprocable platen, first and second forming dies mounted on said platen in side-by-side relation, a presser head assembly overlying each said dies and including presser arms to embrace said forming dies, means for mounting a metal blank to have a portion thereof rolled over said first die by the presser arms of the associated head assembly, means for mounting a blank pre-shaped by said first forming die to have a portion thereof annularly spaced from the pre-shaped portion rolled over said second forming die, the pre-shaped blank being inverted for operation thereon by said second die, and a depression in said second die to receive the pre-shaped portion of the blank.

5. A machine according to claim 4, characterized by operating controls for said platen and said head assemblies to effect in a single reciprocating motion of said platen the production of one pre-shaped blank and one finished blank.

6. A machine for producing semi-finished and finished rotary forged pans, comprising a reciprocable platen, first and second sets of forming dies carried by said platen, means for supporting a flat metal blank and a semi-finished blank in spaced overlying relation to said first and second sets of dies respectively, first and second sets of rotatable presser head assemblies overlying said blank supporting means, said dies and said presser head assemblies cooperating to extrude portions of said blanks by a rotary forging action, the dies of said second set being recessed to receive the extruded portions of the blank formed by the dies of said first set, and means for automatically feeding and ejecting the work to and from the machine, blanks semi-finished by said first set of dies being inverted and reinserted in the machine to be acted upon by said second set of dies.

EUGEN STIEFELMAYER.

References Cited in the file of this patent
UNITED STATES PATENTS

| Number | Name | Date |
|---|---|---|
| 65,035 | Young | May 21, 1867 |
| 344,459 | Paull | June 29, 1886 |
| 460,550 | Bodge | Oct. 6, 1891 |
| 816,694 | Watzke | Apr. 3, 1906 |
| 1,497,001 | Rotherham | June 10, 1924 |
| 1,903,592 | Hiester | May 2, 1933 |
| 1,953,934 | Hiester | Apr. 10, 1934 |
| 1,994,034 | Carroll | Mar. 12, 1935 |
| 2,097,356 | Truesdale | Oct. 26, 1937 |